United States Patent
Han et al.

(10) Patent No.: US 12,284,555 B2
(45) Date of Patent: Apr. 22, 2025

(54) CELL HANDOVER METHOD, APPARATUS AND DEVICE, AND STORAGE MEDIUM

(71) Applicant: ZTE CORPORATION, Shenzhen (CN)

(72) Inventors: Jiren Han, Shenzhen (CN); Yin Gao, Shenzhen (CN); Dapeng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 269 days.

(21) Appl. No.: 17/793,330

(22) PCT Filed: Jan. 20, 2021

(86) PCT No.: PCT/CN2021/072792
§ 371 (c)(1),
(2) Date: Jul. 15, 2022

(87) PCT Pub. No.: WO2021/147880
PCT Pub. Date: Jul. 29, 2021

(65) Prior Publication Data
US 2023/0048866 A1 Feb. 16, 2023

(30) Foreign Application Priority Data
Jan. 20, 2020 (CN) .......................... 202010064340.6

(51) Int. Cl.
*H04W 36/22* (2009.01)
*H04W 36/00* (2009.01)
*H04W 36/08* (2009.01)

(52) U.S. Cl.
CPC ...... *H04W 36/0011* (2013.01); *H04W 36/087* (2023.05); *H04W 36/22* (2013.01)

(58) Field of Classification Search
None
See application file for complete search history.

(56) References Cited

U.S. PATENT DOCUMENTS

2016/0112922 A1 4/2016 Han et al.
2019/0174561 A1* 6/2019 Sivavakeesar ........ H04W 48/12
(Continued)

FOREIGN PATENT DOCUMENTS

| CN | 108810968 A | 11/2018 |
| CN | 109803334 A | 5/2019 |
| CN | 110366202 A | 10/2019 |

OTHER PUBLICATIONS

International Search Report for Application No. PCT/CN2021/072792, dated Apr. 12, 2021, 4 pages including English translation.
(Continued)

*Primary Examiner* — Jenkey Van
(74) *Attorney, Agent, or Firm* — Morgan, Lewis & Bockius LLP

(57) ABSTRACT

Provided are a cell switching method and apparatus, a device, and a storage medium. The method includes the following. A first interface message is sent to a second network element, where the first interface message carries UE related information; a user context modification instruction triggered by the second network element is received, where the user context modification instruction is determined and triggered according to the first interface message, and the user context modification instruction is configured for triggering the handover of a target UE from a source cell to a target cell.

16 Claims, 5 Drawing Sheets

(56) References Cited

U.S. PATENT DOCUMENTS

2019/0380087 A1    12/2019  Park et al.
2020/0084682 A1*   3/2020   Wang .................... H04W 28/18
2020/0260324 A1*   8/2020   Byun ..................... H04W 4/70

OTHER PUBLICATIONS

Nokia, "Load management for disaggregated g NB", *3GPP TSG-RAN WG3#103bis R3-191644*, Xian, China, Apr. 8-12, 2019, Apr. 12, 2019 (Apr. 12, 2019), sections 2-5, 3 pages.
First Search Report in Chinese Application No. 2020100643406, dated Sep. 19, 2024, 6 pages, including translation.
First Chinese Application No. 202010064340.6, dated Sep. 25, 2024, 14 pages, including translation.

* cited by examiner

CELL HANDOVER METHOD, APPARATUS AND DEVICE, AND STORAGE MEDIUM

CROSS-REFERENCES TO RELATED APPLICATIONS

This is a National Stage Application, filed under 35 U.S.C. 371, of International Patent Application No. PCT/CN2021/072792, filed on Jan. 20, 2021, which is based on and claims priority to Chinese Patent Application No. 202010064340.6 filed with the China National Intellectual Property Administration (CNIPA) on Jan. 20, 2020, the disclosure of which is incorporated herein by reference in its entirety

TECHNICAL FIELD

The present application relates to the field of communication, in particular, a cell handover method and apparatus, a device and a storage medium.

BACKGROUND

Load balancing is an important characteristic in the self-optimizing network (SON) function. Through the load balancing, the network side can appropriately adjust and allocate the load of a cell in the network. For example, a User Equipment (UE) in a congested cell is handed over to an idle cell. In this optimization manner, system capacity is improved, user experience is enhanced, and human intervention in network management and optimization tasks is minimized. In the 5th Generation (5G) mobile communication system, the 5G base station supports a Distributed Unit/Centralized Unit (DU/CU) split architecture. As a result, how to perform the cell handover on the UE in the 5G mobile communication system is an urgent problem to be solved at present.

SUMMARY

Embodiments of the present application provide a cell handover method and apparatus, a device and a storage medium, so as to achieve load balancing of the 5G communication system.

The embodiments of the present application provide a cell handover method. The method is applied to a first network element and includes the following.

A first interface message is sent to a second network element, where the first interface message carries UE related information.

A user context modification instruction triggered by the second network element is received, where the user context modification instruction is determined and triggered according to the first interface message, and the user context modification instruction is configured for triggering the handover of a target UE from a source cell to a target cell.

The embodiments of the present application provide a cell handover method. The method is applied to a second network element and includes the following.

A first interface message sent by a first network element is received, wherein the first interface message carries UE related information.

A user context modification instruction is fed back to the first network element, where the user context modification instruction is determined and triggered according to the first interface message, and the user context modification instruction is configured for triggering the handover of a target UE from a source cell to a target cell.

The embodiments of the present application provide a cell handover apparatus. The apparatus is applied to a first network element and includes a first sending module and a first reception module.

The first sending module is configured to send a first interface message to a second network element, where the first interface message carries UE related information.

The first reception module is configured to receive a user context modification instruction triggered by the second network element, where the user context modification instruction is determined and triggered according to the first interface message, and the user context modification instruction is configured for triggering the handover of a target UE from a source cell to a target cell.

The embodiments of the present application provide a cell handover apparatus. The apparatus is applied to a second network element and includes a second reception module and a first feedback module.

The second reception module is configured to receive a first interface message sent by a first network element, where the first interface message carries UE related information.

The first feedback module is configured to feed back a user context modification instruction to the first network element, where the user context modification instruction is determined and triggered according to the first interface message, and the user context modification instruction is configured for triggering the handover of a target UE from a source cell to a target cell.

The embodiments of the present application provide a device. The device includes a memory and one or more processors.

The memory is configured to store one or more programs.

The one or more programs, when executed by the one or more processors, cause the one or more processors to implement the method of any one of the preceding embodiments.

The embodiments of the present application provide a storage medium. The storage medium is configured to store a computer program which, when executed by a processor, implements the method of any one of the preceding embodiments.

DETAILED DESCRIPTION

Embodiments of the present application are described below in conjunction with drawings.

A split 5G base station may include two parts, that is, a New Generation Radio Access Network Node (gNB) Central Unit (gNB-CU) and a gNB Distributed Unit (gNB-DU). A split 5G base station has only one gNB-CU as a centralized control node, and the one gNB-CU can connect and manage multiple gNB-DUs. A gNB-DU is connected to the one gNB-CU through an F1 interface.

Figure 1:
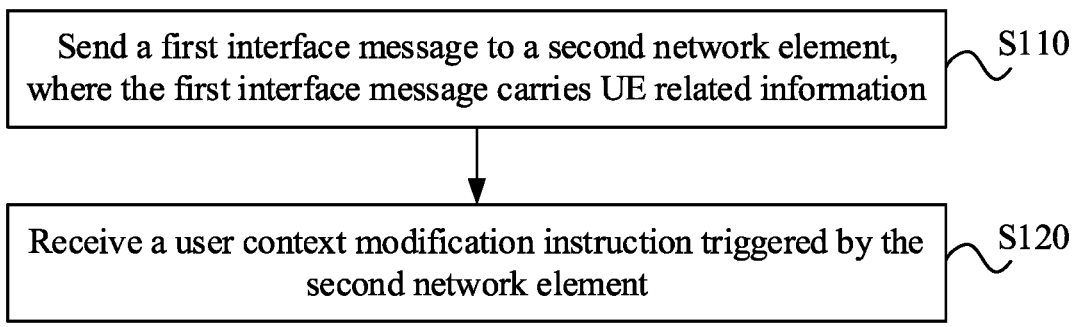
FIG. 1 is a flowchart of a cell handover method according to an embodiment of the present application.

After load information interaction is performed between the gNB-CU and the gNB-DU, the gNB-CU learns the load situation of different gNB-DUs under the gNB-CU, and then migrates the UE under the gNB-DU having a relatively high load to the gNB-DU having a relatively low load. Therefore, the selection function of the gNB-CU and the gNB-DU for the UE needing to be handed over and the handover flow based on load information interaction need to be clearly defined to better improve the load balancing function. In an implementation, FIG. 1 is a flowchart of a cell handover method according to an embodiment of the present application. The embodiment is applied to a first network element. Exemplarily, the first network element may be a gNB-DU. As shown in FIG. 1, the embodiment includes S110 to S120.

In S110, a first interface message is sent to a second network element, where the first interface message carries UE related information.

In the embodiment, the second network element may be a gNB-CU. In the embodiment, in a case where the load of a cell in the first network element reaches a preset threshold, sending of the first interface message is triggered, that is, the sending of the first interface message from the first network element to the second network element is triggered. In an embodiment, the first interface message carries the UE related information. The UE related information may be all UE related information in a congested cell under the first network element, or may be one or more pieces of UE related information needing to be handed over in a congested cell under the first network element. In the embodiment, the all UE related information refers to the information related to all UEs in a congested cell under the first network element; the one or more pieces of UE related information refer to the information related to one or more UEs in a congested cell under the first network element.

In S120, a user context modification instruction triggered by the second network element is received.

In the embodiment, the user context modification instruction is determined and triggered according to the first interface message, and the user context modification instruction is configured for triggering the handover of a target UE from a source cell to a target cell.

In the embodiment, after receiving the first interface message sent by the first network element, the second network element triggers the user context modification instruction to trigger the handover of the target UE from the source cell to the target cell. In an embodiment, the target UE may be determined by the first network element or by the second network element. In an embodiment, in a case where the target UE is determined by the first network element, when the first network element sends the first interface message to the second network element, the first interface message only carries part of the information related to the target UE, that is, in addition to carrying UE identity information, the first interface message may further carry other information of the target UE. In an embodiment, in a case where the target UE is determined by the second network element, when the first network element sends the first interface message to the second network element, the first interface message carries the information related to all the UEs in the congested cell.

In the embodiment, the user context modification instruction may be determined and triggered according to the first interface message, that is, the user context modification instruction is determined in the second network element; or, according to the UE related information corresponding to the target UE determined by the first network element, the corresponding user context modification instruction is determined, so that the handover of the target UE by the second network element from the source cell to the target sell is triggered. In this manner, the cell where the UE is located and the load of which exceeds a preset threshold is handed over, so that the load balancing of every cell is ensured.

In an embodiment, the target cell and the source cell may be under the same first network element or under different first network elements. It may be understood that in a case where the target cell and the source cell are under different first network elements, the cell handover of the target UE refers to the handover of the target UE under different first network elements.

In an embodiment, in a case where the load of a cell in the first network element reaches a preset threshold, the sending of the first interface message is triggered.

In the embodiment, the preset threshold may be a threshold configured for each cell under the first network element or may be a threshold configured for all cells under the first network element. In an embodiment, in a case where the preset threshold is the threshold of all cells under the first network element, the preset threshold is the sum of thresholds of all cell under the first network element. Exemplarily, it is assumed that there are five cells under the first network element and the load threshold of each cell is a, thus the preset threshold is 5a.

In an embodiment, the first interface message includes one of: a user context modification request message or a resource state update message. In the embodiment, the content contained in the user context modification request message may be the same as or different from the content contained in the resource state update message.

In an embodiment, in a case where the first interface message is the user context modification request message, before the user context modification instruction fed back by the second network element is received, the method further includes: receiving a user context modification confirmation message fed back by the second network element. In the embodiment, the user context modification confirmation message is configured for feeding back to the first network element related text information of the target UE whose cell needing to be handed over, so that the first network element updates the text information of the target UE in time.

In an embodiment, the UE related information includes at least one of: UE identity information, a physical resource block (PRB) occupancy, a Modulation and Coding Scheme (MCS), space division information or channel state information (CSI). In the embodiment, the UE identity information is configured for distinguishing between identities of different UEs in the same cell. It may be understood that the UE identity information corresponding to each UE is unique.

In an embodiment, in a case where the target UE is determined by the first network element, the UE related information includes at least: the UE identity information. In the embodiment, in the case where the target UE is determined by the first network element, to save the load for transmitting information, the first network element sends the UE related information carrying only the UE identity information to the second network element. In an embodiment, the UE related information may also include any other information among the PRB occupancy, the MCS, the space division information and the CSI.

In an embodiment, in a case where the target UE is determined by the second network element, the UE related information includes at least: the UE identity information, the PRB occupancy, the MCS, the space division information and the CSI.

In an embodiment, the UE identity information includes at least one of: a user F1 interface application protocol identity or a radio access network user identity.

Figure 2:
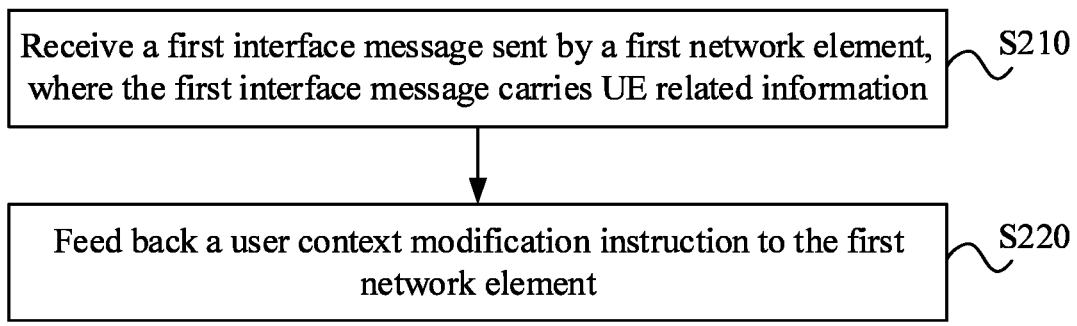
FIG. 2 is a flowchart of another cell handover method according to an embodiment of the present application.

FIG. 2 is a flowchart of another cell handover method according to an embodiment of the present application. The embodiment is applied to a second network element. Exemplarily, the second network element may be a gNB-CU. As shown in FIG. 2, the embodiment includes S210 to S220.

In S210, a first interface message sent by a first network element is received, where the first interface message carries UE related information.

In S220, a user context modification instruction is fed back to the first network element.

In the embodiment, the user context modification instruction is determined and triggered according to the first interface message, and the user context modification instruction is configured for triggering the handover of a target UE from a source cell to a target cell.

In the embodiment, after receiving the first interface message, the second network element triggers the user context modification instruction to trigger the handover of the target UE from the source cell to the target cell.

In an embodiment, the target cell and the source cell may be under the same first network element or under different first network elements. It may be understood that in a case where the target cell and the source cell are under different first network elements, the cell handover of the target UE refers to the handover of the target UE under different first network elements.

In an embodiment, in a case where the first interface message is a user context modification request message, before the user context modification instruction is fed back to the first network element, the method further includes: feeding back a user context modification confirmation message to the first network element.

In the embodiment, for the explanation of different terms involved in the cell handover method applied to a second network element, reference may be made to the description of the cell handover method applied to a first network element in the preceding embodiments, which is not repeated here.

Figure 3:
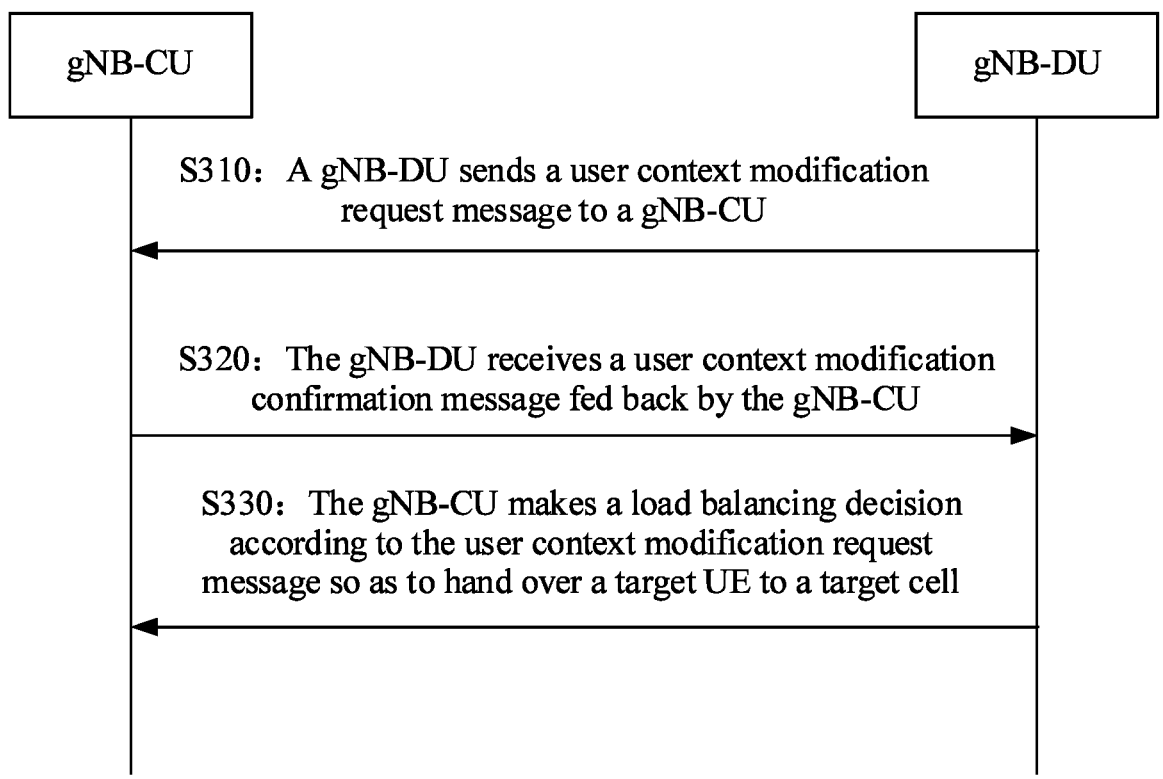
FIG. 3 is a diagram illustrating the interaction flow of a cell handover according to an embodiment of the present application.

In an implementation, FIG. 3 is a diagram illustrating the interaction flow of a cell handover according to an embodiment of the present application. The first interface message in the embodiment is the user context modification request message. The cell handover process is illustrated through the example in which the first network element is a gNB-DU, and the second network element is a gNB-CU. As shown in FIG. 3, the embodiment includes S310 to S330.

In S310, a gNB-DU sends a user context modification request message to a gNB-CU.

In an embodiment, the gNB-DU sends the user context modification request message (denoted as: UE Context Modification Required) to the gNB-CU. In the embodiment, the user context modification request message carries UE related information (that is, the UE related information in the preceding embodiments) in a congested cell under the gNB-DU. In the embodiment, the UE related information may include: UE identity information, a physical resource block usage, a Modulation and Coding Scheme, channel state information, space division information, etc. In the embodiment, the UE identity information may include: a user F1 interface application protocol identity (denoted as: UE F1AP ID) and a radio access network user identity (denoted as: RAN UE ID). In the embodiment, the UE needing to be handed over is selected by the gNB-DU according to the strategy of the operator.

In an embodiment, the gNB-DU selects the UE needing to be handed over according to the strategy of the operator, and sends the user context modification request message to the gNB-CU. In the embodiment, the user context modification request message carries the identity information of the selected UE. In the embodiment, the identity information of the UE may include: the user F1 interface application protocol identity and the radio access network user identity.

In S320, the gNB-DU receives a user context modification confirmation message fed back by the gNB-CU.

In the embodiment, the gNB-CU sends the user context modification confirmation message (denoted as: UE Context Modification Confirm) to the gNB-DU, that is, the gNB-DU receives the user context modification confirmation message fed back by the gNB-CU.

In S330, the gNB-CU makes a load balancing decision according to the user context modification request message so as to hand over a target UE to a target cell.

In the embodiment, the gNB-CU makes the load balancing decision according to the UE related information reported by the gNB-DU, selects the UE (that is, the target UE) needing to be handed over, and hands over the UE needing to be handed over to the target cell, thereby achieving load balancing of the cell.

Figure 4:
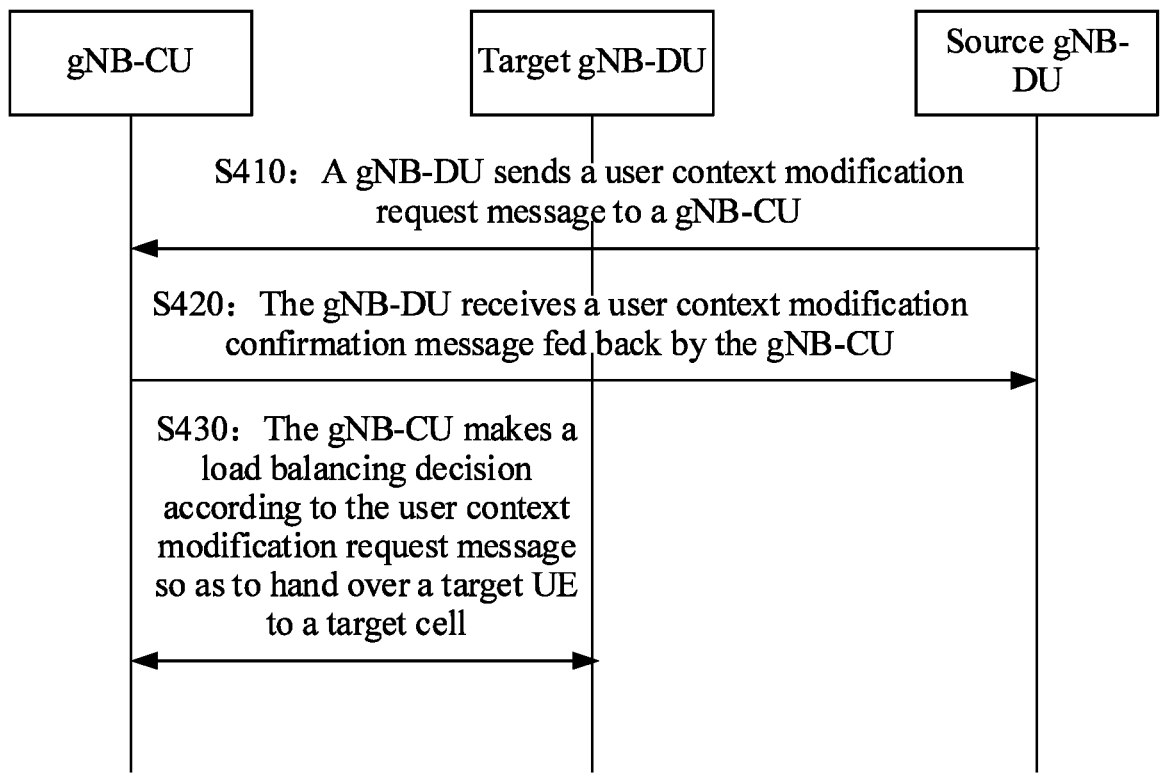
FIG. 4 is a diagram illustrating the interaction flow of another cell handover according to an embodiment of the present application.

In an implementation, FIG. 4 is a diagram illustrating the interaction flow of another cell handover according to an embodiment of the present application. The first interface message in the embodiment is the user context modification request message. The cell handover process is illustrated through the example in which the first network element is a gNB-DU, and the second network element is a gNB-CU. In the embodiment, the cell handover process is illustrated through the example in which is a target UE is handed over from a source gNB-DU to a target gNB-DU. As shown in FIG. 4, the embodiment includes S410 to S430.

In S410, a gNB-DU sends a user context modification request message to a gNB-CU.

In an embodiment, a source gNB-DU sends a user context modification request message to a gNB-CU. In the embodiment, the user context modification request message carries UE related information in a congested cell under the source gNB-DU. The UE related information may include: UE identity information, a physical resource block usage, a Modulation and Coding Scheme, channel state information, space division information, etc. In the embodiment, the UE identity information may include: a user F1 interface application protocol identity and a radio access network user identity. In the embodiment, the UE needing to be handed over is selected by the gNB-DU according to the strategy of the operator.

In an embodiment, the source gNB-DU selects the UE needing to be handed over according to the strategy of the operator, and sends the user context modification request message to the gNB-CU. In the embodiment, the user context modification request message carries the identity information of the selected UE. In the embodiment, the identity information of the UE may include: the user F1 interface application protocol identity and the radio access network user identity.

In S420, the gNB-DU receives a user context modification confirmation message fed back by the gNB-CU.

In the embodiment, the gNB-CU sends the user context modification confirmation message (denoted as: UE Context Modification Confirm) to the source gNB-DU, that is, the source gNB-DU receives the user context modification confirmation message fed back by the gNB-CU.

In S430, the gNB-CU makes a load balancing decision according to the user context modification request message so as to hand over a target UE to a target cell.

In the embodiment, the gNB-CU makes the load balancing decision according to the UE related information reported by the source gNB-DU, selects the UE needing to be handed over, and hands over the UE needing to be handed over to a target cell under a target gNB-DU, thereby achieving load balancing of the cell.

Figure 5:
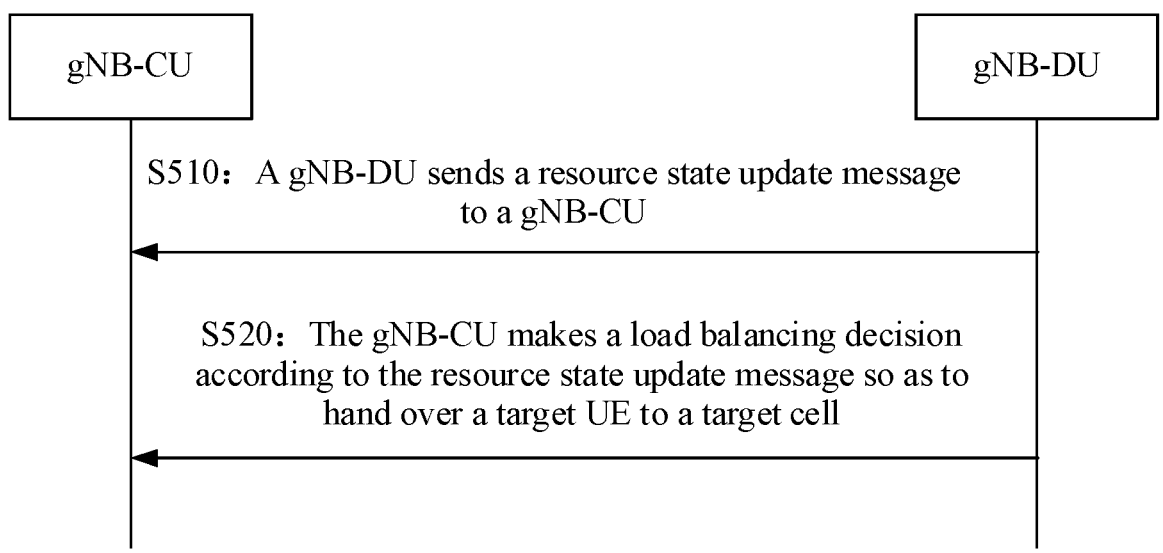
FIG. 5 is a diagram illustrating the interaction flow of another cell handover according to an embodiment of the present application.

In an implementation, FIG. 5 is a diagram illustrating the interaction flow of another cell handover according to an embodiment of the present application. The first interface message in the embodiment is the resource state update message. The cell handover process is illustrated through the example in which the first network element is a gNB-DU, and the second network element is a gNB-CU. As shown in FIG. 5, the embodiment includes S510 to S520.

In S510, a gNB-DU sends a resource state update message to a gNB-CU.

In an embodiment, the gNB-DU sends the resource state update message to the gNB-CU. In the embodiment, the resource state update message carries UE related information in a congested cell under the gNB-DU. The UE related information may include: UE identity information, a physical resource block usage, a Modulation and Coding Scheme, channel state information, space division information, etc. In the embodiment, the UE identity information may include: a user F1 interface application protocol identity and a radio access network user identity. In the embodiment, the UE needing to be handed over is selected by the gNB-DU according to the strategy of the operator.

In an embodiment, the gNB-DU selects the UE needing to be handed over according to the strategy of the operator, and sends the resource state update message to the gNB-CU. In the embodiment, the resource state update message carries the identity information of the selected UE. In the embodiment, the identity information of the UE may include: the user F1 interface application protocol identity and the radio access network user identity.

In S520, the gNB-CU makes a load balancing decision according to the resource state update message so as to hand over a target UE to a target cell.

In the embodiment, the gNB-CU makes the load balancing decision according to the UE related information reported by the gNB-DU, selects the UE needing to be handed over, and hands over the UE needing to be handed over to the target cell, thereby achieving load balancing of the cell.

Figure 6:
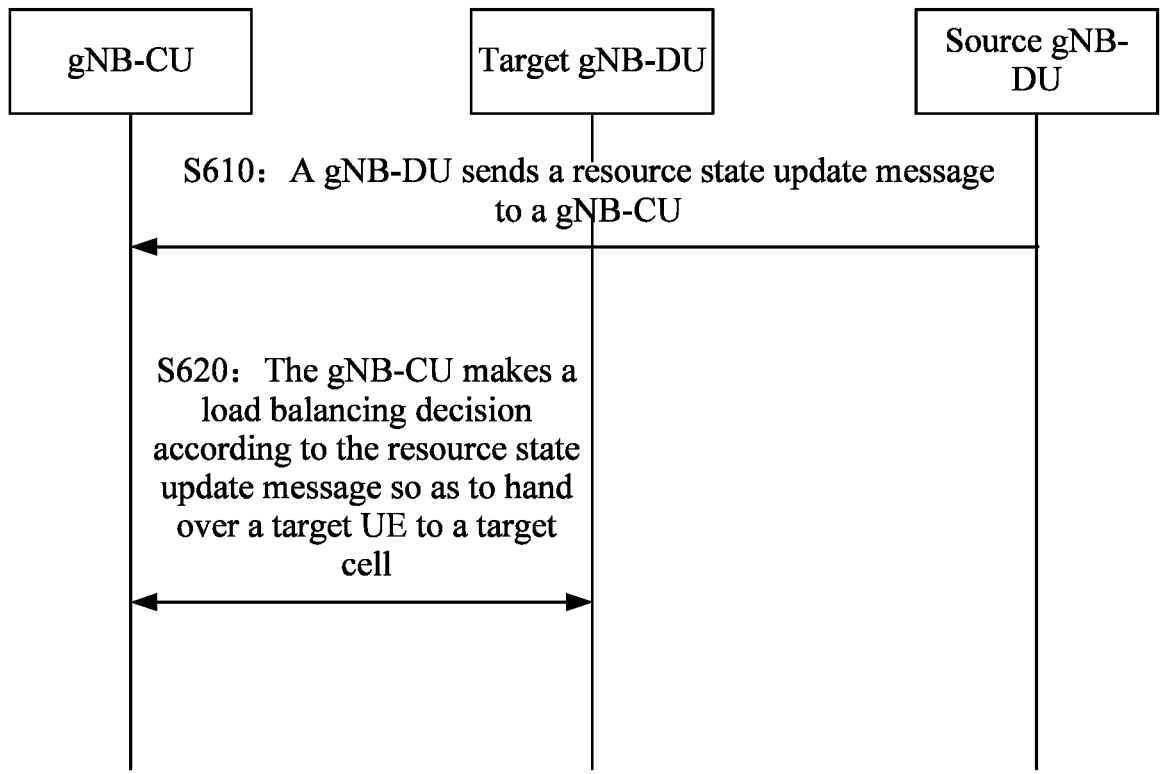
FIG. 6 is a diagram illustrating the interaction flow of another cell handover according to an embodiment of the present application.

In an implementation, FIG. 6 is a diagram illustrating the interaction flow of another cell handover according to an embodiment of the present application. The first interface message in the embodiment is the resource state update message. The cell handover process is illustrated through the example in which the first network element is a gNB-DU, and the second network element is a gNB-CU. In the embodiment, the cell handover process is illustrated through the example in which is a target UE is handed over from a source gNB-DU to a target gNB-DU. As shown in FIG. 6, the embodiment includes S610 to S620.

In S610, a gNB-DU sends a resource state update message to a gNB-CU.

In an embodiment, the source gNB-DU sends the resource state update message to the gNB-CU. In the embodiment, the resource state update message carries UE related information in a congested cell under the source gNB-DU. In the embodiment, the UE related information may include: UE identity information, a physical resource block usage, a Modulation and Coding Scheme, channel state information, space division information, etc. In the embodiment, the UE identity information may include: a user F1 interface application protocol identity and a radio access network user identity. In the embodiment, the UE needing to be handed over is selected by the gNB-DU according to the strategy of the operator.

In an embodiment, the source gNB-DU selects the UE needing to be handed over according to the strategy of the operator, and sends the resource state update message to the gNB-CU. In the embodiment, the resource state update message carries the identity information of the selected UE. In the embodiment, the identity information of the UE may include: the user F1 interface application protocol identity and the radio access network user identity.

In S620, the gNB-CU makes a load balancing decision according to the resource state update message so as to hand over a target UE to a target cell.

In the embodiment, the gNB-CU makes the load balancing decision according to the UE related information reported by the source gNB-DU, selects the UE needing to be handed over, and hands over the UE needing to be handed over to a target cell under a target gNB-DU, thereby achieving load balancing of the cell.

Figure 7:
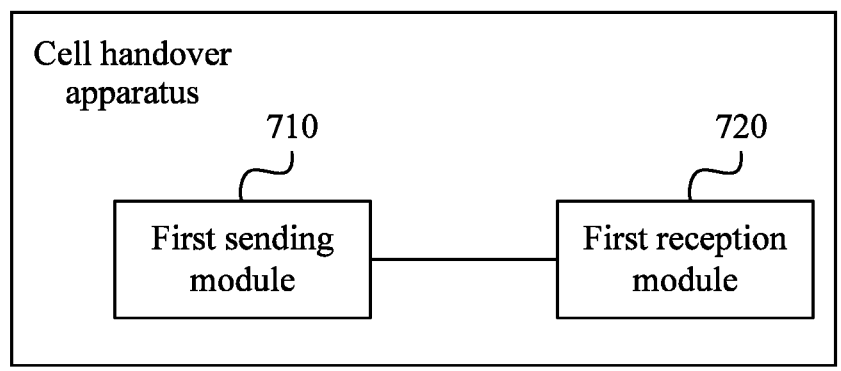
FIG. 7 is a diagram illustrating the structure of a cell handover apparatus according to an embodiment of the present application.

FIG. 7 is a diagram illustrating the structure of a cell handover apparatus according to an embodiment of the present application. The embodiment is applied to a first network element. As shown in FIG. 7, the apparatus involves: a first sending module 710 and a first reception module 720.

The first sending module 710 is configured to send a first interface message to a second network element, where the first interface message carries UE related information.

The first reception module 720 is configured to receive a user context modification instruction triggered by the second network element, where the user context modification instruction is determined and triggered according to the first interface message, and the user context modification instruction is configured for triggering the handover of a target UE from a source cell to a target cell.

The cell handover apparatus provided in the embodiment is configured to implement the cell handover method applied to a first network element in the embodiment shown in FIG. 1, and has the similar implementation principles and technical effects, which are not repeated herein.

In an embodiment, in a case where the load of a cell in the first network element reaches a preset threshold, the sending of the first interface message is triggered.

In an embodiment, the first interface message includes one of: a user context modification request message or a resource state update message.

In an embodiment, in a case where the first interface message is the user context modification request message, the cell handover apparatus applied to a first network element further includes a third reception module.

The third reception module is configured to, before the user context modification instruction fed back by the second network element is received, receive a user context modification confirmation message fed back by the second network element.

In an embodiment, the UE related information includes at least one of: UE identity information, a physical resource block (PRB) occupancy, a Modulation and Coding Scheme (MCS), space division information or channel state information (CSI).

In an embodiment, in a case where the target UE is determined by the first network element, the UE related information includes at least: the UE identity information.

In an embodiment, in a case where the target UE is determined by the second network element, the UE related information includes at least: the UE identity information, the PRB occupancy, the MCS, the space division information and the CSI.

In an embodiment, the UE identity information includes at least one of: a user F1 interface application protocol identity or a radio access network user identity.

In an embodiment, the first network element is a New Generation Radio Access Network Node Distributed Unit (gNB-DU), and the second network element is a gNB Central Unit (gNB-CU).

Figure 8:
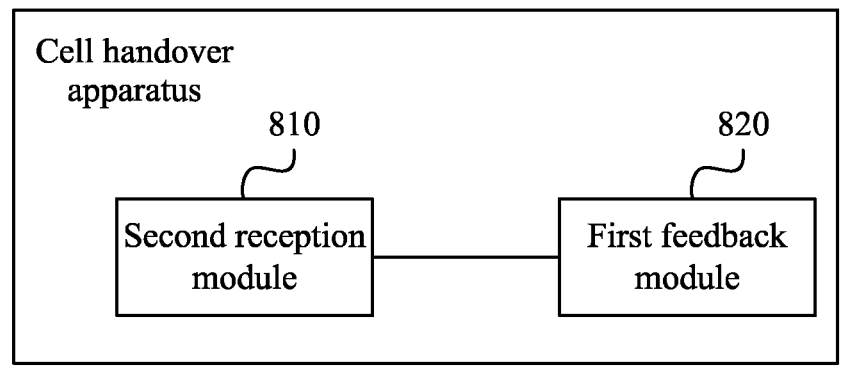
FIG. 8 is a diagram illustrating the structure of another cell handover apparatus according to an embodiment of the present application.

FIG. 8 is a diagram illustrating the structure of another cell handover apparatus according to an embodiment of the present application. The embodiment is applied to a second network element. As shown in FIG. 8, the embodiment involves: a second reception module 810 and a first feedback module 820.

The second reception module 810 is configured to receive a first interface message sent by a first network element, where the first interface message carries UE related information.

The first feedback module 820 is configured to feed back a user context modification instruction to the first network element, where the user context modification instruction is determined and triggered according to the first interface message, and the user context modification instruction is configured for triggering the handover of a target UE from a source cell to a target cell.

The cell handover apparatus provided in the embodiment is configured to implement the cell handover method applied to a second network element in the embodiment shown in FIG. 2, and has the similar implementation principles and technical effects, which are not repeated herein.

In an embodiment, in a case where the first interface message is the user context modification request message, the cell handover apparatus applied to the second network element further includes a second feedback module.

The second feedback module is configured to, before the user context modification instruction is fed back to the first network element, feed back a user context modification confirmation message to the first network element.

Figure 9:
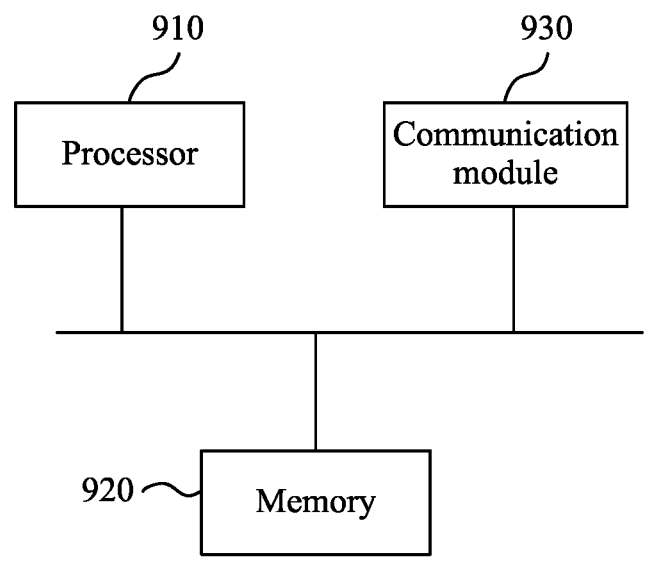
FIG. 9 is a diagram illustrating the structure of a device according to an embodiment of the present application.

FIG. 9 is a diagram illustrating the structure of a device according to an embodiment of the present application. As shown in FIG. 9, the device provided in the present application includes a processor 910, a memory 920 and a communication module 930. One or more processors 910 may be disposed in the device. FIG. 9 shows one processor 910 as an example. One or more memories 920 may be disposed in the device. FIG. 9 shows one memory 920 as an example. The processor 910, the memory 920 and the communication module 930 in the device may be connected by a bus or in other manners. FIG. 9 shows a connection by the bus as an example. In the embodiment, the device is a first network element.

As a computer-readable storage medium, the memory 920 may be configured to store software programs and computer-executable programs and modules, such as program instructions/modules (for example, the first sending module and the first reception module in the cell handover apparatus) corresponding to the device according to any embodiment of the present application. The memory 920 may include a program storage region and a data storage region, where the program storage region may store an operating system and an application program required by at least one function, and the data storage region may store data created depending on the use of the device. Moreover, the memory 920 may include a high-speed random-access memory, and may further include a non-volatile memory such as at least one magnetic disk memory, a flash memory or another non-volatile solid-state memory. In some examples, the memory 920 may further include memories remotely disposed relative to the processor 910, and these remote memories may be connected to the device via a network. Examples of the preceding network include, but are not limited to, the Internet, an intranet, a local area network, a mobile communication network, and a combination thereof. The communication module 930 is configured for performing communication interaction between the first network element and the second network element.

The device provided above may be configured to execute the cell handover method applied to a first network element that is provided by any preceding embodiment, and has corresponding functions and effects.

In a case where the device is a second network element, the device provided above may be configured to execute the cell handover method applied to a second network element that is provided by any preceding embodiment, and has corresponding functions and effects.

An embodiment of the present application further provides a storage medium containing computer-executable instructions which, when executed by a computer processor, are configured for executing a cell handover method applied to a first network element. The method includes the following. A first interface message is sent to a second network element, where the first interface message carries UE related information; a user context modification instruction triggered by the second network element is received, where the user context modification instruction is determined and triggered according to the first interface message, and the user context modification instruction is configured for triggering the handover of a target UE from a source cell to a target cell.

An embodiment of the present application further provides a storage medium containing computer-executable instructions which, when executed by a computer processor, are configured for executing a cell handover method applied to a second network element. The method includes the following. A first interface message sent by a first network element is received, where the first interface message carries UE related information; a user context modification instruction is fed back to the first network element, where the user context modification instruction is determined and triggered according to the first interface message, and the user context modification instruction is configured for triggering the handover of a target UE from a source cell to a target cell.

It is to be understood by those skilled in the art that the term "user equipment" covers any suitable type of wireless user equipment, for example, a mobile phone, a portable data processing apparatus, a portable web browser or a vehicle-mounted mobile station.

In general, multiple embodiments of the present application may be implemented in hardware or special-purpose circuits, software, logic or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. A computer program may be stored in a memory. The memory may be of any type suitable for a local technical environment and may be implemented using any suitable data storage technology, such as, but not limited to, a read-only memory (ROM), a random-access memory (RAM), and an optical memory apparatus and system (a digital video disc (DVD) or a compact disc (CD)). Computer-readable media may include non-transitory storage media. The data processor may be in any type suitable for a local technical environment, for example, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

What is claimed is:

1. A cell handover method, applied to a first network element, comprising:
   sending a first interface message to a second network element, wherein the first interface message carries User Equipment (UE) related information; and
   receiving a user context modification instruction sent by the second network element, wherein the user context modification instruction is determined according to the first interface message, and the user context modification instruction is configured for triggering a handover of a target UE from a source cell to a target cell;
   wherein the first network element is a New Generation Radio Access Network Node Distributed Unit (gNB-DU), and the second network element is a gNB Central Unit (gNB-CU);
   wherein the sending the first interface message to the second network element comprising: in response to a load of a cell in the first network element reaching a preset threshold, triggering sending of the first interface message;
   wherein the preset threshold is a sum of thresholds of all cells under the first network element.

2. The method according to claim 1, wherein the first interface message comprises one of: a user context modification request message or a resource state update message.

3. The method according to claim 2, in response to the first interface message being the user context modification request message, before receiving the user context modification instruction fed back by the second network element, further comprising:
   receiving a user context modification confirmation message fed back by the second network element.

4. The method according to claim 1, wherein the UE related information comprises at least one of: UE identity information, a physical resource block (PRB) occupancy, a Modulation and Coding Scheme (MCS), space division information or channel state information (CSI).

5. The method according to claim 4, wherein in a case where the target UE is determined by the first network element, the UE related information comprises at least: the UE identity information.

6. The method according to claim 4, wherein in a case where the target UE is determined by the second network element, the UE related information comprises at least: the UE identity information, the PRB occupancy, the MCS, the space division information and the CSI.

7. The method according to claim 4, wherein the UE identity information comprises at least one of: a user F1 interface application protocol identity or a radio access network user identity.

8. A cell handover method, applied to a second network element, comprising:
   receiving a first interface message sent by a first network element, wherein the first interface message carries UE related information; and
   feeding back a user context modification instruction to the first network element, wherein the user context modification instruction is determined according to the first interface message, and the user context modification instruction is configured for triggering a handover of a target UE from a source cell to a target cell;
   wherein the first network element is a New Generation Radio Access Network Node Distributed Unit (gNB-DU), and the second network element is a gNB Central Unit (gNB-CU);
   wherein the first interface message is triggered to send to the second network element in response to a load of a cell in the first network element reaching a preset threshold, the preset threshold is a sum of thresholds of all cells under the first network element.

9. A cell handover apparatus, applied to a first network element, comprising:
   at least one processor; and
   a memory communicatively connected to the at least one processor;
   wherein the memory stores instructions executable by the at least one processor, and the instructions, when executed by the at least one processor, cause the at least one processor to perform:
   sending a first interface message to a second network element, wherein the first interface message carries User Equipment (UE) related information; and
   receiving a user context modification instruction sent by the second network element, wherein the user context modification instruction is determined according to the first interface message, and the user context modification instruction is configured for triggering a handover of a target UE from a source cell to a target cell;

wherein the first network element is a New Generation Radio Access Network Node Distributed Unit (gNB-DU), and the second network element is a gNB Central Unit (gNB-CU);

wherein the sending the first interface message to the second network element comprising: in response to a load of a cell in the first network element reaching a preset threshold, triggering sending of the first interface message;

wherein the preset threshold is a sum of thresholds of all cells under the first network element.

10. A device, comprising: a memory and at least one processor, wherein the memory is configured to store at least one program; and the at least one program, when executed by the at least one processor, causes the at least one processor to implement a cell handover method, wherein the cell handover method comprises:

sending a first interface message to a second network element, wherein the first interface message carries User Equipment (UE) related information; and receiving a user context modification instruction sent by the second network element, wherein the user context modification instruction is determined according to the first interface message, and the user context modification instruction is configured for triggering a handover of a target UE from a source cell to a target cell;

wherein a first network element is a New Generation Radio Access Network Node Distributed Unit (gNB-DU), and the second network element is a gNB Central Unit (gNB-CU);

wherein the sending the first interface message to the second network element comprising: in response to a load of a cell in the first network element reaching a preset threshold, triggering sending of the first interface message;

wherein the preset threshold is a sum of thresholds of all cells under the first network element.

11. A non-transitory storage medium storing a computer program which, when executed by a processor, causes the processor to implement the method claim 1.

12. The method according to claim 5, wherein the UE identity information comprises at least one of: a user F1 interface application protocol identity or a radio access network user identity.

13. The cell handover apparatus according to claim 9, wherein the first interface message comprises one of: a user context modification request message or a resource state update message.

14. The cell handover apparatus according to claim 13, in response to the first interface message being the user context modification request message, before receiving the user context modification instruction fed back by the second network element, further comprising:

receiving a user context modification confirmation message fed back by the second network element.

15. The cell handover apparatus according to claim 9, wherein the UE related information comprises at least one of: UE identity information, a physical resource block (PRB) occupancy, a Modulation and Coding Scheme (MCS), space division information or channel state information (CSI).

16. The cell handover apparatus according to claim 15, wherein in a case where the target UE is determined by the first network element, the UE related information comprises at least: the UE identity information.

* * * * *